(No Model.)
C. T. BROWN.
ELECTRIC SMELLING BOTTLE.
No. 383,794. Patented May 29, 1888.
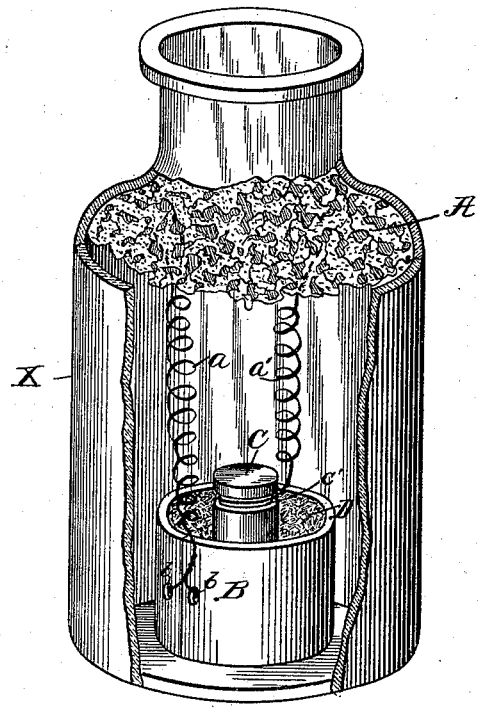
Witnesses:
Wm. Rheem.
Flora L. Brown.
Inventor:
Charles T. Brown.
N. PETERS, Photo-Lithographer, Washington, D. C.

United States Patent Office.

CHARLES T. BROWN, OF CHICAGO, ILLINOIS, ASSIGNOR TO FLORA L. BROWN, OF SAME PLACE.

ELECTRIC SMELLING-BOTTLE.

SPECIFICATION forming part of Letters Patent No. 383,794, dated May 29, 1888.

Application filed December 23, 1887. Serial No. 258,838. (No model.)

*To all whom it may concern:*

Be it known that I, CHARLES T. BROWN, a citizen of the United States, and a resident of Chicago, in the county of Cook and State of Illinois, have invented certain new and useful Improvements in Electric Smelling-Bottles, of which the following is a complete description.

My invention relates to the class of electric batteries intended to be portable and designed to produce a moderate constant current of electricity for a long time; and the purpose of my invention is to produce a battery of the kind named, in which the current of electricity generated therein shall be continually directed through a sponge or other porous material sufficiently saturated with liquids or oils to become a proper conductor thereof; and the principal feature of my invention consists in the combination by means of which I obtain a battery in which no free liquid is required to generate the desired current of electricity, and by which the said current is directed upon the article or articles held in solution in the liquid or oil before referred to, forming a part of the circuit necessary for the operation of the battery.

I have illustrated my invention by the drawings accompanying this specification and forming a part hereof, in which—

Figure 1 is an elevation of a strip of zinc forming one of the elements of my battery. Fig. 2 is an elevation of the carbon pencil, also one of the elements of my invention. Fig. 3 is an elevation of the completed battery.

Like letters refer to like parts throughout the several views.

X is the bottle in which my battery is placed.

A is a sponge wetted with oil or other liquid to form a conductor. In order that sponge A may retain its character as a conductor for a long time, I prefer to employ oil.

$a$ is a wire embedded at one end in sponge A and secured at the other end to zinc B. $a'$ is a like wire embedded in sponge A at one end and secured at the other end to carbon pencil C.

B is a ring of zinc, formed of a strip of sheet-zinc, B, having a hole, $b\ b$, at each end thereof, the two ends being brought together and secured by threading wire $a$ in the said holes and afterward twisting said wire.

C is a carbon pencil having a groove, $C'$, therein. Wire $a'$ is placed in groove $C'$ and secured therein by twisting in the same manner as wire $a$ is secured in zinc ring B.

D is an asbestus packing, serving to keep carbon C and zinc B from coming in contact, accidentally or otherwise, and also serving as a porous or fibrous material which may be saturated with the acids necessary to generate a current of electricity in my improved battery.

The operation of my invention is as follows: Sponge A is saturated with oil holding in solution any desired liquid or solid ingredients to be acted upon or affected by the current of electricity generated by my improved battery. Acids of the ordinary and proper kind are mixed with oil, glycerine, or other liquid and porous material, D, sufficiently saturated therewith. Sponge A, saturated, as described, with oil, forms an electric conductor, uniting in a sufficiently perfect manner wires $a\ a'$, and the current of electricity generated by the action of the acids in porous material, D, upon carbon C and zinc ring B passes over said wires $a\ a'$ through sponge A and the liquid material in said sponge, forming the complete circuit required, and the battery is thus working upon a "closed circuit," so called.

Having thus described my invention, its construction, and manner of operation, what I claim, and desire to secure by Letters Patent, is—

The combination, with a containing-vessel, of a battery comprising a sheet of zinc bent into a tube, a carbon stick contained in the tube, and an asbestus diaphragm saturated with an excitant between the zinc and carbon, and a sponge saturated with an electrolyzable compound in circuit with the elements of the battery.

CHARLES T. BROWN.

Witnesses:
 FLORA L. BROWN,
 GEO. S. POWELL.